No. 711,499. Patented Oct. 21, 1902.
G. HOVE.
LOOM JACQUARD.
(Application filed Oct. 17, 1901.)
(No Model.) 3 Sheets—Sheet 1.

No. 711,499. Patented Oct. 21, 1902.
G. HOVE.
LOOM JACQUARD.
(Application filed Oct. 17, 1901.)
(No Model.) 3 Sheets—Sheet 2.

Witness=
L. H. Grote
C. Sedgwick

Inventor=
Gustave Hove
By Osgood & Co.,
Attys.

No. 711,499. Patented Oct. 21, 1902.
G. HOVE.
LOOM JACQUARD.
(Application filed Oct. 17, 1901.)
(No Model.)  3 Sheets—Sheet 3.

Witnesses:
L. H. Grote.
C. Sedgwick

Inventor
Gustave Hove
By Osgood & Co.
Attys

UNITED STATES PATENT OFFICE.

GUSTAVE HOVE, OF BELFAST, IRELAND.

LOOM-JACQUARD.

SPECIFICATION forming part of Letters Patent No. 711,499, dated October 21, 1902.

Application filed October 17, 1901. Serial No. 78,909. (No model.)

*To all whom it may concern:*

Be it known that I, GUSTAVE HOVE, designer, a citizen of the French Republic, residing at 105 Falls road, Belfast, Ireland, have invented certain new and useful Improvements in Loom-Jacquards, of which the following is a specification.

This invention relates to a method of obtaining on common harness or twilling Jacquard power and hand looms the satins in the figures or designs running in a reverse way to the satins in the ground and also to the binding of the figures on each vertical and horizontal side, so as to make a perfect cloth.

The invention applies to satins of five and its derivatives—seven, eight, nine, ten, twelve, &c.—and also composites such as five in the ground and eight or ten in the figure, to satins in ground and diagonals in figures, and vice versa, to diagonals in ground and diagonals in figures, and, in fact, to all armures or bindings used in damask fabrics.

In order that the invention may be properly understood, I have hereunto appended drawings, whereon—

Figures 1, 2:
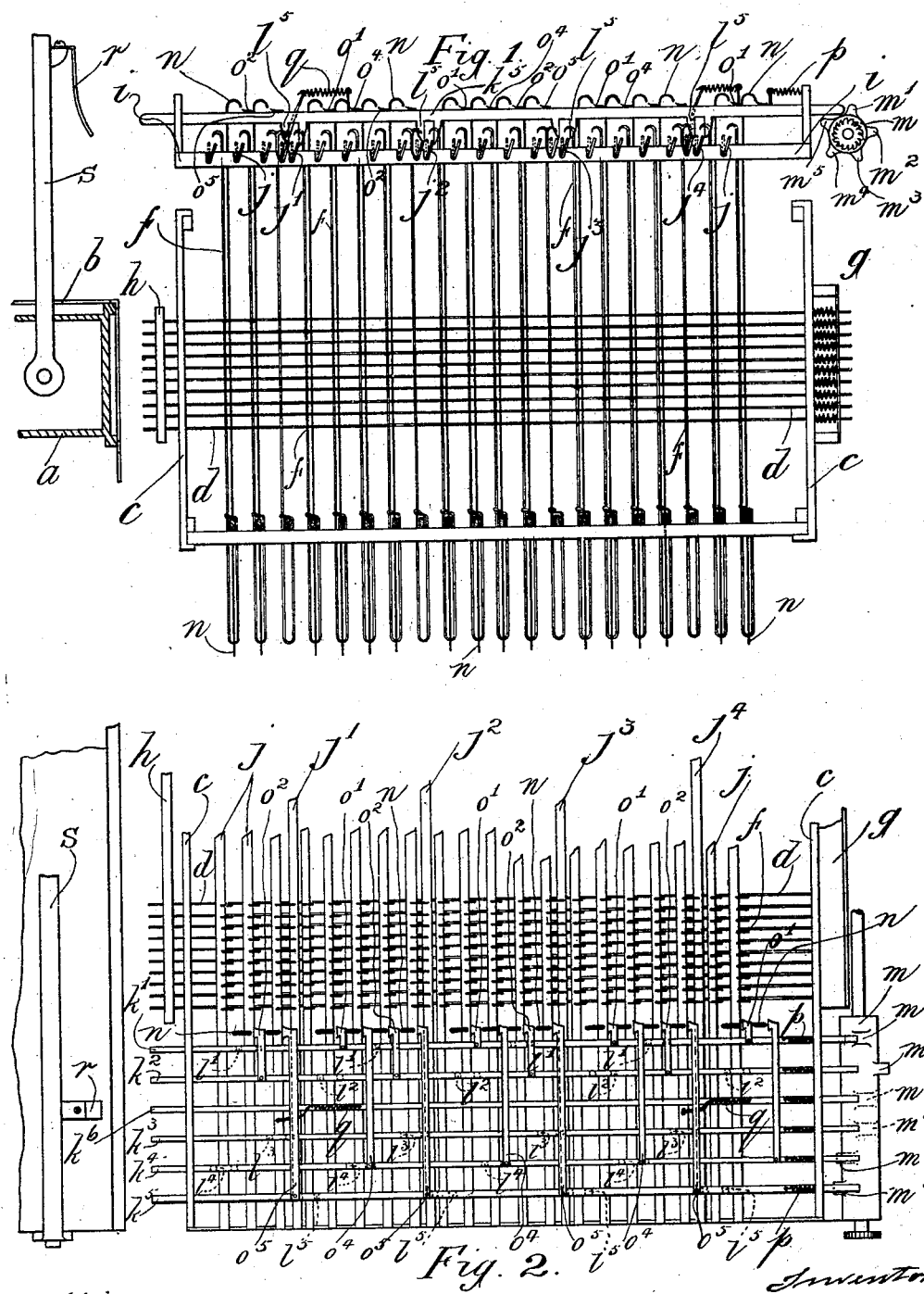
Figure 3:
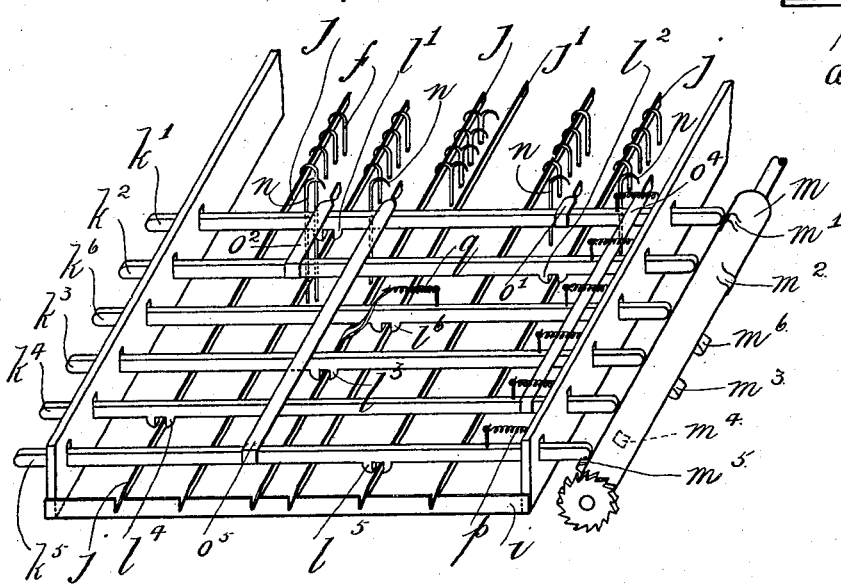
Figure 4:
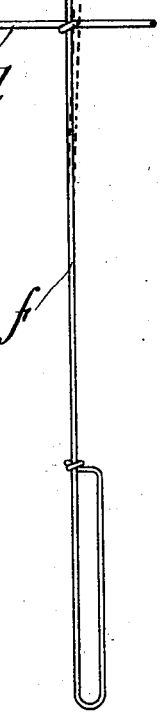

Figure 1 shows in side view part of the jacquard mechanism of an ordinary twilling-loom of the well-known "Bessbrook" pattern and as altered in accordance with my invention. Fig. 2 is a part plan view of the mechanism. Fig. 3 is a view of a special hook used by me. Fig. 4 is a diagrammatic sketch plan drawn with a view of illustrating my invention clearly. It shows a few "griff-knives" and twilling-bars with a few hooks. Figs. 5, 6, 7, 8, 9, 10, and 11 are diagrams explaining the method of working my invention.

In Figs. 1 and 2, $a$ represents the card-cylinder; $b$, the cards; $c$, the needle-frame; $d$, the needles; $f$, the ordinary rows of vertical hooks; $g$, the spring-box; $h$, the perforated board; $i$, the griff-frame; $j$, the ordinary movable griff knives or blades; $k'$ to $k^5$, the ordinary twilling-bars; $l$, the pins on the bars for moving the knives; $m$, the peg-cylinder; $m'$ to $m^5$, pegs on the cylinder; $n$, the ordinary long lifting-hooks of the Bessbrook machine, and $o$ the catches on the twilling-bars for lifting these hooks.

Sufficient only has been shown on the drawings to enable one skilled in the art of weaving on a Bessbrook loom to readily understand the same.

The Bessbrook loom is referred to in *The Mechanism of Weaving*, by T. W. Fox, published by MacMillan & Co., Ltd., of London, 1900.

Figs. 1 and 2 show a "double-scale" jacquard—that is, one having two hooks $f$ to each needle $d$.

A five-hundred machine—*i. e.*, one having five hundred needles with two hooks to each needle—is called "double scale" and consists of twenty rows of fifty hooks, or one thousand hooks in all.

A "treble scale" has three hooks to the needle and thirty rows of fifty hooks, or fifteen hundred hooks in all.

A "quadruple scale" has four hooks to each needle and forty rows of fifty hooks, or two thousand hooks in all, and so on.

In the five-satin or four and one satin double-scale machine represented at Figs. 1 and 2 there are ten rows of needles (with twenty hooks in each row) and twenty rows of hooks (with fifty in each row.)

Under my invention I fit in the griff-frame of the machine a special knife $j'$ midway between the ordinary third and fourth knives, a special knife $j^2$ between the eighth and ninth knives, a special knife $j^3$ between the thirteenth and fourteenth, and a special knife $j^4$ between the eighteenth and nineteenth. These knives are made and arranged in the griff-frame just the same as the ordinary knives. I also make the third, eighth, thirteenth, and eighteenth rows of hooks double-headed, in the manner illustrated at Fig. 3. As will be seen, there are two hooks on each wire, and the one is turned to the one side the same as the other ordinary hooks, while the other is turned to the opposite side. In Fig. 3, 1 is the one hook, and 2 the other hook, while $j$ is the ordinary knife, and $j'$ the special knife. I also provide a special twilling-bar $k^6$, which is located between the second and third bars (see Fig. 2) and is retracted like the others by a spring $p$. This bar is connected by means, preferably, of the two springs $q$ to two of the ordinary griff-knives.

$r$ is a spring fitted on the cylinder-frame $s$ and which can act upon the special bar $k^6$.

Figure 5:
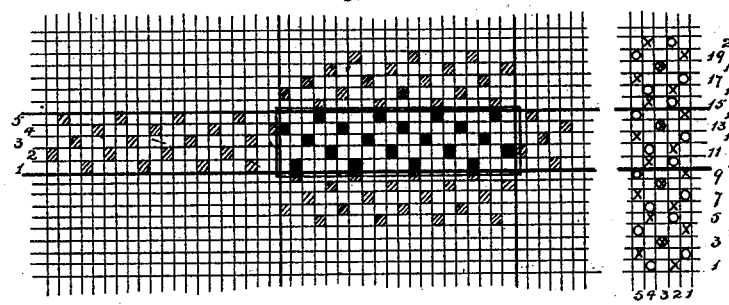
Figure 5:
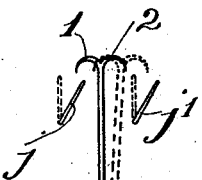

Now if we take a five-hundred machine, five satin double scale, with twenty rows of fifty hooks, it will be possible to obtain by the actual working principle of the common harness-power looms the satins as in the diagram Fig. 5, where the white spaces of the paper represent the ground, the part within the double line the figure, the cross-hatched dots the binding in the ground, and the black dots the binding in the figure. $x$ represents "lifts" and $o$ "prevents," or vice versa, and the device of a cross within a circle "clashing."

It will be seen from studying Figs. 1, 2, and 4 (Fig. 4 shows the simple arrangement for five rows of hooks, while Figs. 1 and 2 show this arrangement repeated four times for the full twenty rows of hooks) that at the first shot the peg $m'$ will actuate twilling-bar $k'$, and by means of the catches $o'$ and their long hooks $n$ (shown in black in Figs. 1 and 2) lift the fourth, ninth, fourteenth, and nineteenth rows of hooks $f$ and prevent by means of the pins $l'$ on the twilling-bar $k'$ shifting their knives $j$ the second, seventh, twelfth, and seventeeth rows of hooks from lifting. Likewise at the second shot the peg $m^2$ actuates the twilling-bar $k^2$ and moves the catches $o^2$ so as to lift the first, sixth, eleventh, and sixteenth rows of hooks $n$ and prevent the fifth, tenth, fifteenth, and twentieth rows from lifting by its pins $l^2$. At the third shot the pegs $m^3 m^6$, which are similarly situated on the peg-cylinder so as to act simultaneously, and the bars $k^3 k^6$ move the pins $l^3 l^6$ and the knives $j$ for the double hooks and the special knives $j' j^2 j^3 j^4$, also for these hooks and thereby lift the third, eighth, thirteenth, and eighteenth rows and also prevent the third, eighth, thirteenth, and eighteenth rows. At the fourth shot the peg $m^4$ and bar $k^4$ lifts the fifth, tenth, fifteenth, and twentieth rows and prevents the first, sixth, eleventh, and sixteenth rows. At the fifth shot the peg $m^5$ and bar $k^5$ lifts the second, seventh, twelfth, and seventeeth rows and prevents the fourth, ninth, fourteenth, and nineteenth rows.

It will be seen, Figs. 2 and 4, that the twilling-bars $k^3$ and $k^6$ have no catches $o$ on them, but are merely provided with pins $l^3 l^6$, Fig. 4, for moving the ordinary knives $j$ and the special knives $j'$ to $j^4$ for the double hooks $f$.

In the third shot the lifting and preventing of numbers three, eight, thirteen, and eighteen being identical, and therefore clashing together, could not work, and in order that the third shot may work it is necessary to move aside the ordinary knives $j$ of the third, eighth, thirteenth, and eighteenth rows of double hooks, so as to prevent the lifting of any of these hooks, which in the ordinary way would have been otherwise lifted through the perforations of the card. This movement of the knives $j$ is effected by the action of the bar $k^3$. The pushing forward of the special knives $j'$ to $j^4$ by the bar $k^6$ causes these knives to move into the vertical position and catch the rear heads of those double hooks $f$ which are pushed back by the non-perforated parts of the card. As a consequence the hooks which are not lifted in the third, eighth, thirteenth, and eighteenth rows will make the binding in the figure, and lifting where there is no figure will operate the binding in the ground.

Fig. 3 explains the action of the knives and hooks. The ordinary hook 1 of the hook $f$ can be caught by the ordinary knife $j$ unless when this knife is pushed forward, (see dotted lines,) while the extra hook 2 is only caught on the special knife $j'$ when this knife is pushed forward by its bar $k^6$ and the hook $f$ pushed back by the needle $d$. (See dotted lines.)

The springs $q$, attached to the griff-knives $j$ and the bar $k^6$, exert when the griff-knives are moved by bar $k^3$ a sufficient tension on the bar $k^6$ to cause it to move forward at the time of lifting and force the special knives to raise up those double-headed hooks pushed back by the card vertically when clear of the other hooks. The forward movement of the bar $k^6$ is checked and regulated by the spring $r$.

To get the perfect binding all around as per Fig. 5 for the double scale or two hooks to the needle and two shots to the card, the designs or figures require to be painted on a number of five ends or threads in the vertical or horizontal ways or on an even number of threads and shots for a two-and-a-half-fold scale or two hooks to the first needle and three hooks to the second needle, and so on, and shot the same way two and three alternately and will give a machine of twenty-five rows of fifty, or twelve hundred and fifty hooks. For a fivefold scale of five hooks to the needle, however the pattern may be painted, it will make a perfect cloth same as a four-fold scale, with eight in ground and eight in figure.

Figure 6:
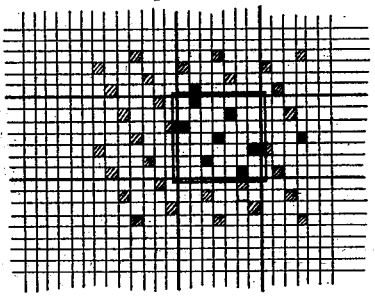
Figure 7:
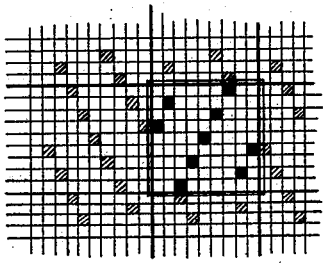

In Fig. 6 an arrangement is shown for satins of seven and in Fig. 7 for satins of nine. In the seven satin the clashing will occur at the fourth shot and in the nine satin at the fifth shot. The arrangement is the same as with the five satin.

Figure 8:
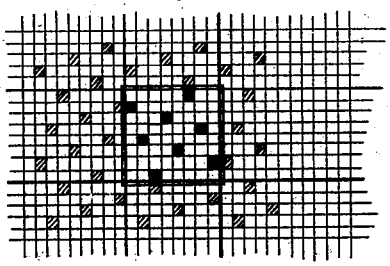

In Fig. 8 I have shown an arrangement for a satin of eight. Being an even satin, there is no trouble in the working. Four hundreds or double scale, sixteen rows of fifty, or eight hundred hooks.

| Lifts. | Prevents. | |
|---|---|---|
| 6, 14 | 3, 11 | 1st shot. |
| 1, 9 | 8, 16 | 2d " |
| 4, 12 | 5, 13 | 3d " |
| 7, 15 | 2, 10 | 4th " |
| 2, 10 | 7, 15 | 5th " |
| 5, 13 | 4, 12 | 6th " |
| 8, 16 | 1, 9 | 7th " |
| 3, 11 | 6, 14 | 8th " |

By this operation—

| Lifts. | Prevents. | |
|---|---|---|
| 2, 6, 10, 14 | 3, 11 | 1st shot. |
| 1, 5, 9, 13 | 8, 16 | 2d " |
| 4, 8, 12, 16 | 5, 13 | 3d " |
| 3, 7, 11, 15 | 2, 10 | 4th " |
| 2, 6, 10, 14 | 7, 15 | 5th " |
| 1, 5, 9, 13 | 4, 12 | 6th " |
| 4, 8, 12, 16 | 1, 9 | 7th " |
| 3, 7, 11, 15 | 6, 14 | 8th " | a ground of three and one diagonal twill and a satin of eight in figure, or vice versa, will be obtained, and other combinations, as plain or taffetas ground one and one and eight satin or diagonal in figure or design, and vice versa, and many other armures or bindings may be obtained by changing twilling-bars and peg-cylinder.

By painting the design on a number of two threads or ends in a double-scale pattern and four shots to the card a perfect binding will be obtained. Likewise in a treble-scale painting on a number of four ends and four shots to the card and in a quadruple scale and four shots will make perfect cloth and binding all around by painting in the ordinary way.

Figure 9:
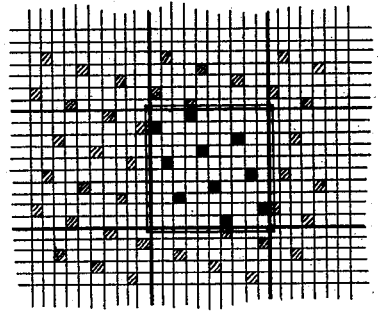

Fig. 9 shows a design for satins of five and ten. Five hundreds, double scale, twenty rows of fifty hooks, or one thousand hooks.

| Lifts. | Prevents. | |
|---|---|---|
| 4, 9, 14, 19 | 7, 17 | 1st shot. |
| 1, 6, 11, 16 | 10, 20 | 2d " |
| 3, 8, 13, 18 | 3, 13 | 3d " |
| 5, 10, 15, 20 | 6, 16 | 4th " |
| 2, 7, 12, 17 | 9, 19 | 5th " |
| 4, 9, 14, 19 | 2, 12 | 6th " |
| 1, 6, 11, 16 | 5, 15 | 7th " |
| 3, 8, 13, 18 | 8, 18 | 8th " |
| 5, 10, 15, 20 | 1, 11 | 9th " |
| 2, 7, 12, 17 | 4, 14 | 10th " |

No. 3 and also No. 13 in third shot and No. 8 and also No. 18 in eighth shot clashing together will have to work as in the machine with four and one satins or satins of five.

For a machine with five in ground and eight in figure, or vice versa, each row will be made the same as the clashing ones in the five and five, besides operating in the ordinary way.

Figure 10:
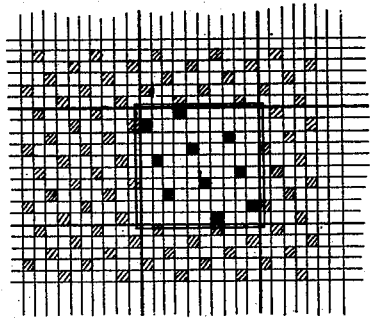

Fig. 10 shows designs for satins of ten and ten. In this case we have—

| Lifts. | Prevents. | |
|---|---|---|
| 4, 14 | 7, 17 | 1st shot. |
| 1, 11 | 10, 20 | 2d " |
| 8, 18 | 3, 13 | 3d " |
| 5, 15 | 6, 16 | 4th " |
| 2, 12 | 9, 19 | 5th " |
| 9, 19 | 2, 12 | 6th " |
| 6, 16 | 5, 15 | 7th " |
| 3, 13 | 8, 18 | 8th " |
| 10, 20 | 1, 11 | 9th " |
| 7, 17 | 4, 14 | 10th " |

Figure 11:
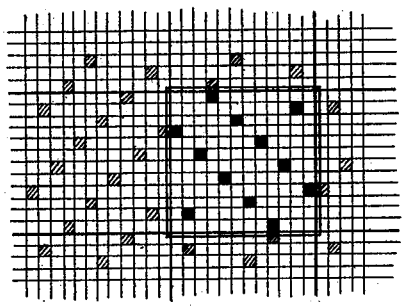

Fig. 11 shows a design for satins of twelve. Six hundred double scale of twenty-four rows of fifty, or twelve hundred hooks. Here we have—

| Lifts. | Prevents. | |
|---|---|---|
| 4, 16 | 9, 21 | 1st shot. |
| 11, 23 | 2, 14 | 2d " |
| 6, 18 | 7, 19 | 3d " |
| 1, 13 | 12, 24 | 4th " |
| 8, 20 | 5, 17 | 5th " |
| 3, 15 | 10, 22 | 6th " |
| 10, 22 | 3, 15 | 7th " |
| 5, 17 | 8, 20 | 8th " |
| 12, 24 | 1, 13 | 9th " |
| 7, 19 | 6, 18 | 10th " |
| 2, 14 | 11, 23 | 11th " |
| 9, 21 | 4, 16 | 12th " |

By lifting 4, 10, 16, 22 and preventing 9 and 21, and so on, a diagonal of six in ground and twelve in satin in the figure, and vice versa, will be obtained.

By a similar combination to the above satin of twelve a satin of eight in ground and twelve in figure, or vice versa, can be obtained, and also other combinations, as in the eight and eight machines.

The method of working will be readily understood from the examples given, and it will also be seen that for certain designs the loom will require to be altered so that the special double hooks and clashing knives may be at the correct places. Thus in the five-satin the third shot is the clashing shot, while in the seven-satin the fourth shot is the clashing one.

The invention can of course be employed in silk and other weaving, as well as for linen damask fabrics. The invention of the eight and eight machines, Fig. 8, two, four, and even eight fold scale are of the greatest advantage to silk, cotton, and woolen manufacturers, as large patterns perfectly bound all around and making the most perfect fabrics can be obtained.

Having now fully described my invention, what I claim, and desire to secure by Letters Patent, is—

1. In the jacquard mechanism of a common harness or twilling loom, the combination with the ordinary rows of single hooks of special rows of double hooks.

2. In the jacquard mechanism of a common harness or twilling loom, the combination with the ordinary rows of single hooks of special rows of double hooks, means for lifting the ordinary hooks and means for lifting the special hooks.

3. In the jacquard mechanism of a common harness or twilling loom, the combination with the ordinary rows of single hooks of special rows of double hooks, a "griff-knife" for each row of ordinary hooks and two "griff-knives" for each row of double hooks, substantially as described.

4. In the jacquard mechanism of a common harness or twilling loom, the combination with the ordinary rows of single hooks of special rows of double hooks, a "griff-knife" for each row of ordinary hooks, two "griff-knives" for each row of double hooks and means for actuating these knives, substantially as described.

5. In the jacquard mechanism of a common harness or twilling loom, the combination with the ordinary rows of single hooks of special rows of double hooks, a "griff-knife" for each row of ordinary hooks, two "griff-knives" for each row of double hooks, twilling-bars for moving the knives and means for operating the twilling-bars, substantially as described.

6. In the jacquard mechanism of a common harness or twilling loom, the combination with the ordinary rows of single hooks of special rows of double hooks, "griff-knives" for lifting the hooks in each row not pushed back by the cards, special "griff-knives" for lifting those double hooks which are pushed back by the cards, twilling-bars for moving the knives, and means for operating the twilling-bars, substantially as described.

7. In the jacquard mechanism of a common harness or twilling loom, the combination with the ordinary rows of single hooks of special rows of double hooks, "griff-knives" for lifting the hooks in each row not pushed back by the cards, special "griff-knives" for lifting those double hooks which are pushed back by the cards, twilling-bars for moving the ordinary knives so as to prevent any of them lifting when necessary, a special twilling-bar for moving the special knives in order that the double hooks pushed back by the cards may be lifted, and means for operating the twilling-bars, substantially as described.

8. In the jacquard mechanism of a common harness or twilling loom, the combination with the ordinary rows of single hooks $f$ of special rows of double hooks, "griff-knives" $j$ for lifting the hooks, special "griff-knives" $j'$ to $j^4$ for lifting those double hooks pushed back by the cards, twilling-bars $k'$ to $k^5$ for moving the ordinary knives, a twilling-bar $k^6$ for moving the special knives, a peg-cylinder $m$ for operating the bars $k'$ to $k^5$ and a special peg $m^6$ on this cylinder for operating the bar $k^6$, substantially as hereinbefore described and shown.

9. In combination in the jacquard mechanism of a loom with the "griff-frame" and the ordinary hooks, knives, and twilling-bars of rows of double hooks $f$, special knives $j'$ to $j^4$, special twilling-bar $k^6$, peg-cylinder with special peg $m^6$, catches $o$ on the twilling-bars, a spring connection between the bar $k^6$ and the knife $j$ operated by the bar $k^3$ and a check-spring $r$ for the bar $k^6$, substantially as hereinbefore described and shown.

Signed at Belfast, Ireland, this 3d day of October, 1901.

GUSTAVE HOVE.

Witnesses:
JAMES BEST,
JAMES C. WEIR.